United States Patent
Ferreri et al.

(10) Patent No.: US 9,992,381 B2
(45) Date of Patent: Jun. 5, 2018

(54) COLOR HASH TABLE REUSE FOR PRINT JOB PROCESSING

(71) Applicants: Vincent William Ferreri, Frederick, CO (US); Walter F. Kailey, Brighton, CO (US); John Thomas Varga, Longmont, CO (US)

(72) Inventors: Vincent William Ferreri, Frederick, CO (US); Walter F. Kailey, Brighton, CO (US); John Thomas Varga, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/051,899

(22) Filed: Feb. 24, 2016

(65) Prior Publication Data
US 2017/0244868 A1 Aug. 24, 2017

(51) Int. Cl.
H04N 1/60 (2006.01)

(52) U.S. Cl.
CPC ......... *H04N 1/6025* (2013.01); *H04N 1/6008* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 5,724,501 A | 3/1998 | Dewey et al. | |
| 6,024,431 A * | 2/2000 | Takahashi | B41J 2/04571 347/106 |
| 6,891,649 B1 * | 5/2005 | Kondo | H04N 1/6052 358/1.9 |
| 7,139,933 B2 | 11/2006 | Hsu et al. | |
| 7,293,196 B2 | 11/2007 | Hicken et al. | |
| 7,561,168 B2 | 7/2009 | Newman et al. | |
| 7,895,465 B2 | 2/2011 | Ash et al. | |
| 8,792,150 B2 | 7/2014 | Moriyama et al. | |
| 2008/0120480 A1 | 5/2008 | Dryfoos et al. | |
| 2011/0010396 A1 * | 1/2011 | Zhou | G06F 17/30958 707/798 |
| 2014/0108362 A1 * | 4/2014 | Kim | H03M 7/3084 707/693 |
| 2014/0223029 A1 * | 8/2014 | Bhaskar | H03M 7/3088 709/247 |

* cited by examiner

*Primary Examiner* — Lennin Rodriguezgonzale
(74) *Attorney, Agent, or Firm* — Duft Bornsen & Fettig LLP

(57) ABSTRACT

One embodiment comprises a system that stores a predefined color conversion table and a hash table. The system receives user-defined color conversions for a print job, stores them in first locations in the hash table, and marks the first locations as persistent. The system processes the print job utilizing the color conversion table to convert colors in the print job to the output color space, and responsive to encountering colors in the print job that do not have color conversions in the color conversion table, interpolates between color conversions in the color conversion table to generate new color conversions, stores the new color conversions in second locations in the hash table, and marks the second locations as non-persistent. The system determines that the hash table is to be re-initialized, allows reuse of the second locations in the hash table, and prevents reuse of the first locations in the hash table.

18 Claims, 8 Drawing Sheets

FIG. 3

| INPUT COLOR SPACE VALUES | OUTPUT COLOR SPACE VALUES | |
|---|---|---|
| 6, 9, 45 | 17, 54, 6, 98 | ← 302 |
| 9, 65, 3 | 78, 4, 36, 24 | ← 303 |
| 7, 65, 4 | 90, 4, 33, 6 | ← 304 |
| 18, 56, 234 | 7, 89, 4, 33 | ← 305 |
| ⋮ | ⋮ | |
| 12, 65, 89 | 45, 77, 82, 68 | ← 306 |

| HASH INDEX | INPUT COLOR SPACE VALUES | OUTPUT COLOR SPACE VALUES | FREE(F), PERSISTENT (P), NON-PERSISTENT(NP) |
|---|---|---|---|
| 1 | | | F |
| 2 | | | F |
| 3 | | | F |
| 4 | | | F |
| ⋮ | ⋮ | ⋮ | |
| N | | | F |

| HASH INDEX | INPUT COLOR SPACE VALUES | OUTPUT COLOR SPACE VALUES | FREE(F), PERSISTENT (P), NON-PERSISTENT(NP) |
|---|---|---|---|
| 1 | | | F |
| 2 | 502 | | F |
| 3 | 14, 58, 54 | 78, 9, 76, 87 | P |
| 4 | 5, 65, 3 | 16, 65, 4, 3 | P |
| ⋮ | 503 | | |
| N | | | F |

FIG. 6

| HASH INDEX | INPUT COLOR SPACE VALUES | OUTPUT COLOR SPACE VALUES | FREE(F), PERSISTENT (P), NON-PERSISTENT(NP) |
|---|---|---|---|
| 1 | 602 | | F |
| 2 | 8, 65, 4 | 82, 4, 35, 18 | NP |
| 3 | 14, 58, 54 | 78, 9, 76, 87 | P |
| 4 | 5, 65, 3 | 16, 65, 4, 3 | 502  P |
| ⋮ | 503 | | |
| N | 85, 5, 4 | 54, 8, 47, 254 | NP |

| HASH INDEX | INPUT COLOR SPACE VALUES | OUTPUT COLOR SPACE VALUES | FREE(F), PERSISTENT (P), NON-PERSISTENT(NP) |
|---|---|---|---|
| 1 | | | F |
| 2 | 8, 65, 4 | 82, 4, 35, 18 | F |
| 3 | 14, 58, 54 | 78, 9, 76, 87 | P |
| 4 | 5, 65, 3 | 16, 65, 4, 3 | P |
| ⋮ | | | |
| N | 85, 5, 4 | 54, 8, 47, 254 | F |

FIG. 8

| HASH INDEX | INPUT COLOR SPACE VALUES | OUTPUT COLOR SPACE VALUES |
|---|---|---|
| 1 | | |
| 2 | | |
| 3 | | |
| 4 | | |
| ⋮ | | |
| N | | |

| FREE(F), USED (U), PERSISTENT (P) |
|---|
| F (00000000) |
| F (00000000) |
| F (00000000) |
| F (00000000) |
| |
| F (00000000) |

COLOR HASH TABLE REUSE FOR PRINT JOB PROCESSING

FIELD

This disclosure relates to the field of printing systems, and in particular, to printing systems that utilize hash tables to temporarily store color conversions during processing of print jobs.

BACKGROUND

Printing systems transform a print job into a printed output by applying colorant(s) to mark a printable medium, such as paper. In order to represent colors specified in the print job, printing systems utilize different colorants that are applied to the medium in different ratios. For instance, a Cyan, Magenta, Yellow, Key black (CMYK) printing system utilizes 4 different colorants to represent the colors specified in the print job.

The colors specified in the print job are often defined in a different color space than the printing system. During the printing process, the printing system performs a color conversion from the input color space of the print job to the output color space of the printing system. This color conversion process may use interpolation to generate the color conversions on the fly. Interpolation is a process that constructs new data points within a range of a discrete set of known data points. For example, the printing system may interpolate the output color space values by constructing data points between two pre-defined color conversion values.

Since interpolation is computationally intensive, the results of the computations are often cached for reuse during processing of the print job. Also, the size of the cache is typically limited in contrast to the number of possible color conversions that may be used for printing the print job. Thus, the cache may be re-initialized when space is exhausted in the cache to make room for the storage of subsequent color conversions.

Re-initializing the cache may result in a number of computational processes recurring each time the cache is re-initialized. For instance, the cache may be used to store specialized color conversions that are then added back to the cache each time the cache is re-initialized. This can result in additional processing at the printing system that demands computational and memory resources, both of which are limited.

SUMMARY

Embodiments described herein provide for the reuse of some locations in a hash table of color conversions during processing of a print job, while preventing the reuse of other locations in the hash table. When a user-defined color conversion is received for a print job, the user-defined color conversion is stored in the hash table and marked as persistent. During processing of the print job, color conversion values are interpolated, stored in the hash table, and marked as non-persistent. If a determination is made that the hash table is to be re-initialized, then the locations in the hash table that are marked as non-persistent are allowed to be reused, while the locations in the hash table that are marked as persistent are prevented from being reused.

One embodiment comprises a system comprising a memory that stores a pre-defined color conversion table having a subset of color conversions that map an input color space to an output color space, and a hash table having a finite number of locations for the addition of color conversions that map the input color space to the output color space. The system further comprises a processor that receives a print job and user-defined color conversions for colors in the print job, stores the user-defined color conversions in first locations in the hash table, marks the first locations as persistent, and processes the print job utilizing the color conversion table to convert colors in the print job to the output color space. In response to encountering colors in the print job that do not have color conversions in the color conversion table, the processor interpolates between color conversions in the color conversion table to generate new color conversions, stores the new color conversions in second locations in the hash table, and marks the second locations as non-persistent. The processor determines that the hash table is to be re-initialized, and re-initializes the hash table to allow reuse of the second locations in the hash table during processing of the print job that are marked as non-persistent, and to prevent reuse of the first locations in the hash table during processing of the print job that are marked as persistent.

Another embodiment comprises a method for re-initializing a hash table. The method comprises storing a pre-defined color conversion table having a subset of color conversions that map an input color space to an output color space, and storing a hash table having a finite number of locations for the addition of color conversions that map the input color space to the output color space. The method further comprises receiving a print job and user-defined color conversions for colors in the print job, storing the user-defined color conversions in first locations in the hash table, and marking the first locations as persistent. The method further comprises processing the print job utilizing the color conversion table to convert colors in the print job to the output color space. In response to encountering colors in the print job that that do not have color conversions in the color conversion table, the method further comprises interpolating between color conversions in the color conversion table to generate new color conversions, storing the new color conversions in second locations in the hash table, and marking the second locations as non-persistent. In response to determining that the hash table is to be re-initialized, the method further comprises re-initializing the hash table by allowing reuse of the second locations in the hash table during processing of the print job that are marked as non-persistent, and preventing reuse of the first locations in the hash table during processing of the print job that are marked as persistent.

Another embodiment comprises a non-transitory computer readable medium embodying programmed instructions which, when executed by a processor of a printing system, direct the processor to store a pre-defined color conversion table having a subset of color conversions that map an input color space to an output color space, to store a hash table having a finite number of locations for the addition of color conversions that map the input color space to the output color space, to receive a print job and user-defined color conversions for colors in the print job, and to store the user-defined color conversions in first locations in the hash table. The instructions further direct the processor to mark the first location as persistent, and to process the print job utilizing the color conversion table to convert colors in the print job to the output color space. In response to encountering colors in the print job that do not have color conversions in the color conversion table, the instructions further direct the processor to interpolate between color conversions in the color conversion table to generate new color conversions, to store the new color conversions in second locations in the hash table, and to mark the second locations as non-persistent. In response to determining that the hash table is to be re-initialized, the instructions further direct the processor to re-initialize the hash table to allow reuse of the second locations in the hash table during processing of the print job that are marked as non-persistent, and to prevent reuse of the first locations in the hash table during processing of the print job that are marked as persistent.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

FIG. 3 illustrates a color conversion table in an exemplary embodiment.

FIG. 4 illustrates a hash table in an exemplary embodiment.

FIG. 5 illustrates a user-defined color conversion that has been added to the hash table of FIG. 4 in an exemplary embodiment.

FIG. 6 illustrates new color conversions that have been added to hash table 108 in an exemplary embodiment.

FIG. 7 illustrates new color conversions that have been marked as free in an exemplary embodiment.

FIG. 8 illustrates a hash table with marked free locations in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
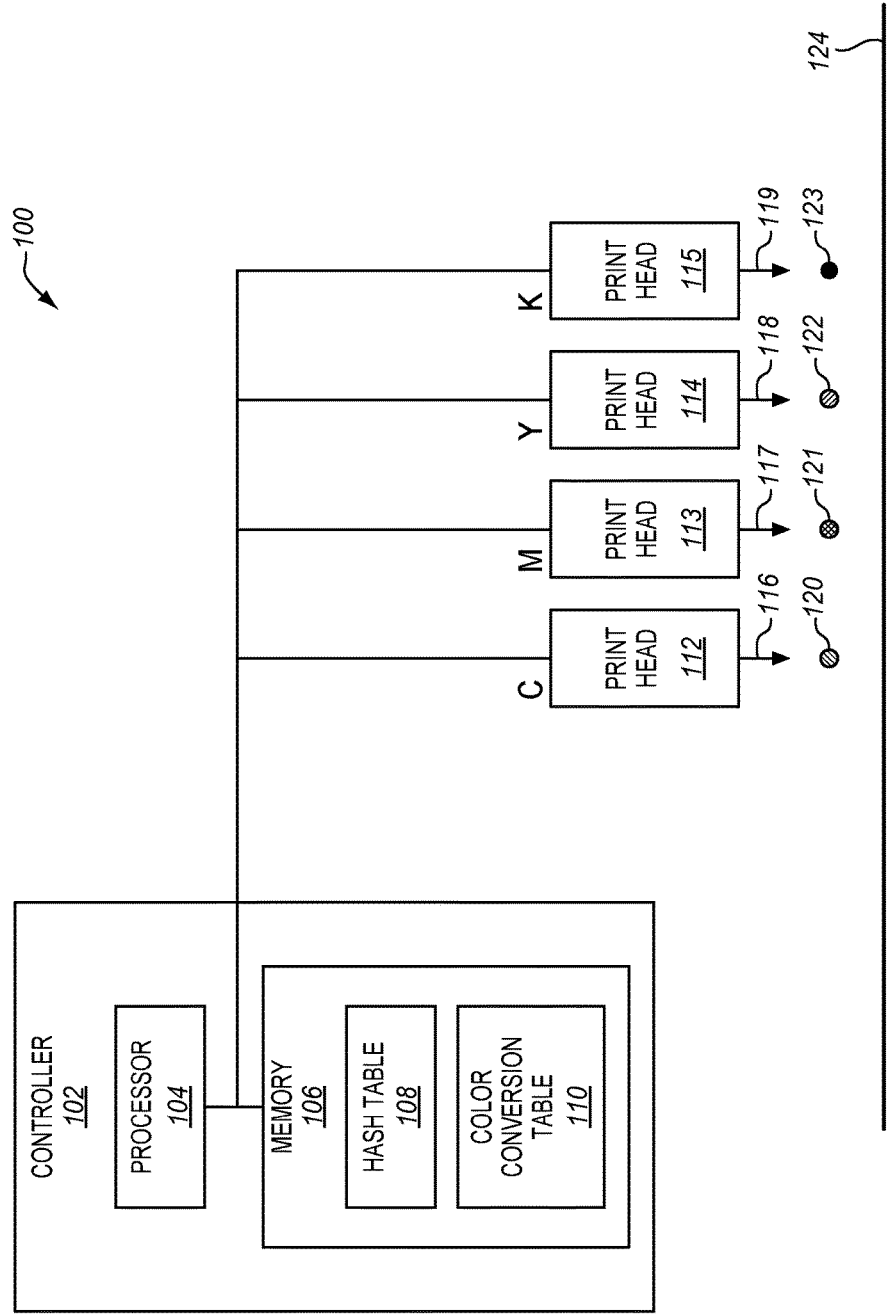
FIG. 1 is block diagram of a printing system in an exemplary embodiment.

FIG. 1 is block diagram of a printing system 100 in an exemplary embodiment. In this embodiment, printing system 100 includes a controller 102 that comprises any component, system, or device that is able to coordinate the printing activities of printing system 100. For instance, controller 102 may perform computations to convert an input color space of a print job to an output color space of printing system 100.

In this embodiment, controller 102 includes one or more processors 104 that are communicatively coupled to a memory 106. Memory 106 stores a hash table 108, which is used to store color conversions that are calculated as-needed during a printing process. Hash table 108 includes a number of locations (not shown) that are used to store the color conversions. In some embodiments, hash table 108 may comprise an open address hash table.

Memory 106 further includes a color conversion table 110, which stores pre-defined color conversions. The pre-defined color conversions do not encompass all of the possible color conversions that may be used by printing system 100 but rather, are a subset of the conversions that may be used. For instance, a print job may define the colors in the job in a Red Green Blue (RGB) format, since computer displays typically display colors by mixing different ratios of R, G, and B color primitives for each pixel of the display. During the printing process, printing system 100 is tasked with converting the input color space of the print job to the color space of printing system 100. When printing system 100 generates a printed output in a Cyan, Magenta, Yellow, Key Black (CMYK) color space, controller 102 is tasked with converting the input color space of a print job (e.g., a RGB color space) to the CMYK color space of printing system 100. In other embodiments, printing system 100 may convert any number of input color spaces to any number of output color spaces. Some examples of input and output color spaces include CMYK, RGB, K, CIELAB, etc. Further any number of bit depths for the input and output color spaces may be supported, including but not limited to 8, 12, 16, 24, etc. Thus, while the following discussion may specifically describe a conversion process from a RGB input color space to a CMYK output color space, one skilled in the art will recognize that the functionality described herein would apply equally to a conversion process from a CMYK input color space to a RGB output color space.

The number of colors in an input color space can be quite large, and they depend upon the number of bits that represent each of the color primitives used by the input color space. For instance, the RGB format uses R, G, and B color primitives, and may represent each of the color primitives using 8, 10, 12, 16, or more bits. If an 8 bit representation is used, then the number of colors represented may exceed 16 million. If 10, 12, or even 16 bits are used to represent each of the R, G, and B color primitives, then the number of possible colors represented can exceed a billion or more.

It is impractical for printing system 100 to store every possible color conversion from the input color space to the output color space due to the sheer amount of data storage that may be used. Instead, printing system 100 stores a subset of the possible color conversions in a color conversion table 110. During processing of a print job, printing system 100 utilizes interpolation to generate new color conversions if color conversions not found in color conversion table 110 for colors in the print job. The new color conversions are stored in hash table 108, which may then be used during a printing process to supply data to a plurality of print heads 112-115. Each of print heads 112-115 includes nozzles 116-119, respectively, which are able to jet colorants 120-123 onto a print medium 124 to generate a printed output. For example, print heads 112-115 may jet CMYK colorants onto print medium 124 as print medium 124 moves in the direction of the arrow illustrated in FIG. 1. Toner based engines may also be used in some embodiments.

Due to memory constraints, hash table 108 is implemented to have a finite number of locations that can store new color conversions. If the input color space could represent some billions of colors, then it would be impractical to allocate enough memory to support the storage of every possible color conversion that may be used during processing of the print job. Further, there are many different input color spaces, meaning spaces with different numbers of color components that are typically defined by the incoming print job. Even in cases where so few as millions of colors exist in a given input color space, it is not practical to store all the possible input colors for a single color transformation, let alone all the color spaces simultaneously in use by a printer.

Due to the finite number of locations that are available in hash table 108, it is possible that the number of locations may be exhausted during the color conversion process. The result is that hash table 108 may be re-initialized during processing of a print job to remove older color conversions and to make room for newer color conversions. However, it would be desirable to retain the user-defined color conversions to preclude them from being re-entered into hash table 108 to reduce the processing burden.

Unlike a typical data structure that simply stores data, adding new color conversions to hash table 108 may utilize a hashing function that determines a location in the hash table where a new color conversion will be stored. The hashing function does not generate a unique hash value for each possible color in the input color space but rather, may generate the same hash value for different colors. This is typically referred to as hash collision. Hash collisions are resolved by stepping through the locations in hash table 108 in a pre-defined manner to identify a location that is available to store a new color conversion. Due to hash collision, adding new color conversions to hash table 108 may involve a number of computations that are often repeated each time hash table 108 is accessed during processing of the print job. Since hash collisions entail stepping through hash table 108 to locate space in hash table 108 to store a new color conversion, it may also be desirable to re-initialize hash table 108 when the number of hash collisions is greater than a threshold. For instance, if a large number of hash collisions are generated when attempting to store new color conversions in hash table 108, then it may be desirable to re-initialize hash table 108 to reduce the processing effort.

In the embodiment described herein, locations in hash table 108 that store the user-defined color conversions are marked as persistent, while the locations in hash table 108 that store the new color conversions generated during interpolation are marked as non-persistent. User-defined color conversions may also be referred to as substitution colors or named colors). If hash table 108 is re-initialized during processing of the print job, then the non-persistent locations are made available to store new color conversions, while the persistent locations are not made available to store new color conversions. This preserves the user-defined color conversions for the print job in hash table 108.

While the specific hardware implementation of controller 102 is subject to design choices, one particular embodiment may include one or more processors 104 communicatively coupled with memory 106. Processor 104 includes any electronic circuits and/or optical circuits that are able to perform functions. For example, processor 104 may perform any functionality described herein for controller 102. Processor 104 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Memory 106 includes any electronic circuits, and/or optical circuits, and/or magnetic circuits that are able to store data. For instance, memory 106 may be used to store hash tables and color conversion tables (e.g. hash table 108 and color conversion table 110). Memory 106 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Figure 2:
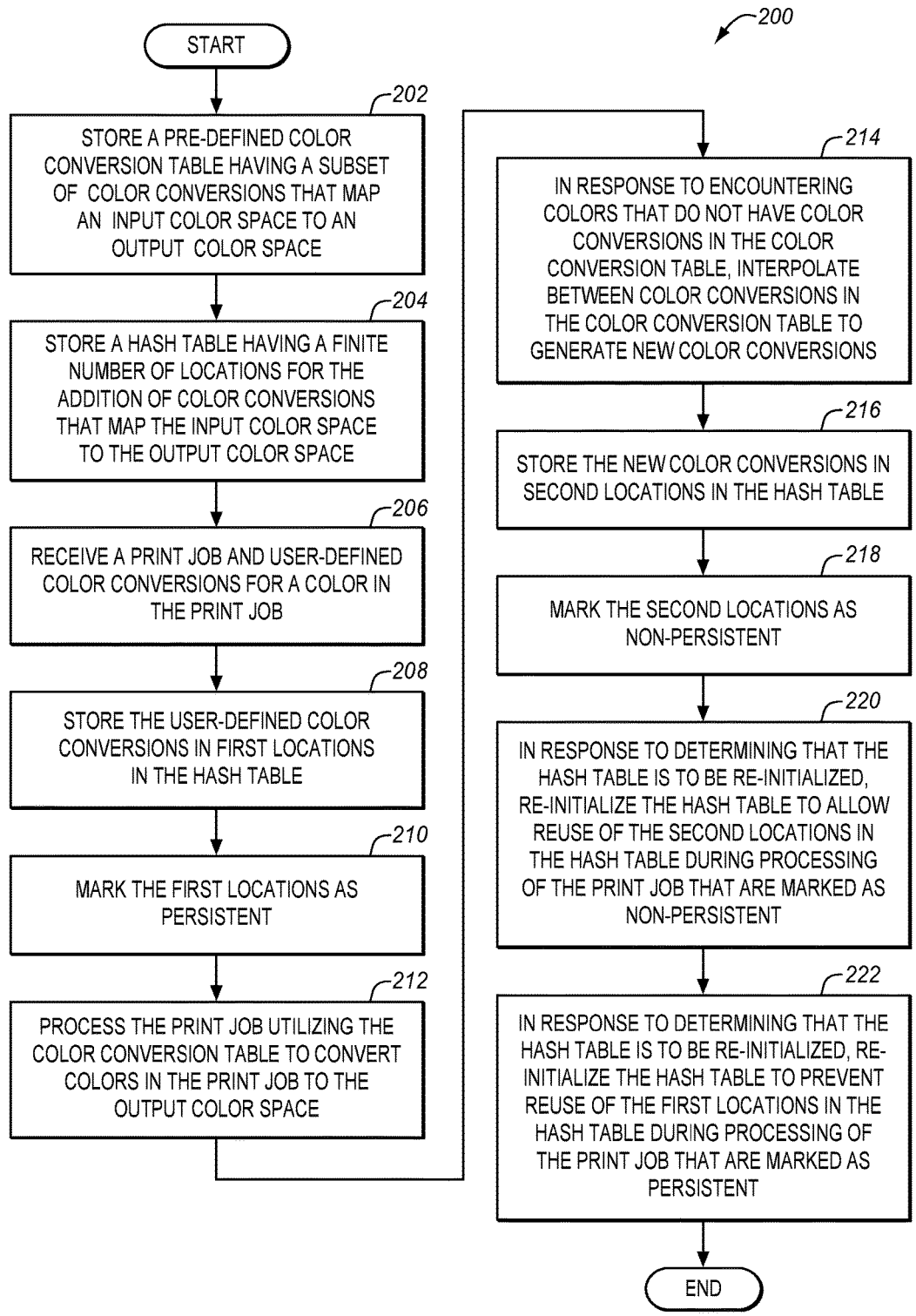
FIG. 2 is a flow chart of a method of re-initializing a hash table in an exemplary embodiment.

Consider that printing system 100 is operational and is ready to convert an input color space of a print job to an output color space of printing system 100. FIG. 2 is a flow chart of a method 200 of re-initializing a hash table in an exemplary embodiment. Method 200 will be discussed with respect to printing system 100 of FIG. 1, although method 200 may be performed by other systems, not shown. The steps of the flow charts described herein may include other steps that are not shown. Also, the steps of the flow charts described herein may be performed in an alternate order.

Processor 104 stores color conversion table 110 having a subset of color conversions that map an input color space to an output color space (see step 202). FIG. 3 illustrates color conversion table 110 in an exemplary embodiment. In this embodiment, the input color space is represented by three color primitives, and the output color space is represented by four color primitives. However, the particular number of input and output color primitives is a matter of design choice. For example, if the input color space is an RGB color space, then the input color space values illustrated in FIG. 3 may represent values for each of the RGB color primitives in a print job. If the output color space is a CMYK color space, then the output color space values illustrated in FIG. 3 may represent values for each of the CMYK color primitives available to printing system 100. Each color conversion 302-306 defines how a color in an input color space (e.g., colors a print job) maps to an output color space (e.g., colors output by printing system 100 utilizing print heads 112-115).

Processor 104 also stores hash table 108, which has a finite number of locations for the addition of color conversions (see step 204). FIG. 4 illustrates hash table 108 in an exemplary embodiment. In this embodiment, hash table 108 includes a number of locations 402-406 that may be populated with new color conversions generated via interpolation during processing of the print job. FIG. 4 illustrates that each of locations 402-406 is associated with a hash index. For instance, location 402 is associated with a hash index of 1, while location 406 is associated with a hash index of N, where N is an arbitrary integer. The particular indexes assigned to locations 402-406 in FIG. 4 are arbitrary for purposes of discussion. Hash table 108 further includes a field that identifies whether locations 402-406 are free, persistent, or non-persistent. Free locations are available to store color conversions. Persistent and non-persistent entries will be discussed later.

Although FIG. 4 illustrates that the free, persistent, and non-persistent field is part of hash table 108, one skilled in the art will recognize that this field may be stored in a data structure that is separate from hash table 108 as a matter of design choice. Also, the particular implementation of how this field represents free, persistent, or non-persistent is a matter of design choice. For instance, in some embodiments, bit fields may be used to represent whether locations 402-406 are free, persistent, or non-persistent.

To enter or locate a color conversion in hash table 108, a hashing function may be applied to the input color space values for a color in the print job. The result of the hashing function is a hash value. This value index may be used to quickly identify a location in hash table 108 that may either be used to recover a color conversion that is already stored in hash table 108 or used to store a color conversion in hash table 108.

In this embodiment, the input color space will be represented by three color primitives and the output color space will be represented by four color primitives. However, the particular number of input and output color primitives is a matter of design choice. For example, if the input color space is an RGB color space, then the input color space values may represent values for each of the RGB color primitives in a print job. If the output color space is a CMYK color space, then the output color space values may represent values for each of the CMYK color primitives available to printing system 100. Each of locations 402-406 in FIG. 4 represents a reserved space for color conversions that may be entered into hash table 108. That locations 402-406 are free for this activity is represented by the letter F in the free, persistent, non-persistent field. One example of how locations 402-406 may be marked as free is using bit fields. For instance, a particular bit location for a bit field may be set to zero in the free, persistent, non-persistent field, which allows processor 104 to identify which locations 402-406 in hash table 108 are free. Using bit fields is just one example, and others may exist.

Processor 104 receives a print job and user-defined color conversions for colors in the print job (see step 206). As discussed previously, a user may define a color conversion for a print job that is different than what printing system 100 may compute utilizing interpolation. This may occur if the user has a preference for how a particular color is represented by printing system 100.

Processor 104 stores the user-defined color conversions at first locations of hash table 108 (see step 208). For example, processor 104 may generate a hash value based on the input color space value for the user-defined color conversion, identify a hash index in hash table 108 that corresponds to the hash value, and store the user-defined color conversion(s) at a location associated with the hash index. FIG. 5 illustrates user-defined color conversions 502-503 that have been added to hash table 108 in an exemplary embodiment. In this embodiment, user-defined color conversions 502-503 correspond to first locations 404-405, respectively. However these relationships are merely for purposes of discussion.

Processor 104 marks first locations 404-405 in hash table 108 as persistent for the user-defined color conversion (see step 210). This is represented in FIG. 5 by marking the free, persistent, non-persistent field with the letter P for locations 404-405. One example of how locations 404-405 may be marked as persistent is using bit fields. For instance, a particular bit location for a bit field may be set to one in the free, persistent, non-persistent field, which allows processor 104 to identify which locations 402-406 in hash table 108 are persistent. Using bit fields is just one example, and others may exist. Bit shifting operations may be used to mark user-defined entries as persistent. For instance, after adding user-defined entries to hash table 108, bit values in the free, persistent, non-persistent field may be left shifted to indicate that those particular entries are persistent.

Processor 104 processes the print job utilizing color conversion table 110 to convert colors in the print job to the output color space of printing system 100 (see step 212). For example, processor 104 may compare a color defined in the print job to color conversions 302-306 in color conversion table 110 to determine if a color conversion exists for the color. Since color conversion table 110 includes a subset of the possible color conversions for an input color space, there are cases where a color defined in the print job does not have a color conversion in color conversion table 110.

If processor 104 encounters colors in the print job that are missing from color conversion table 110 during processing of the print job, then processor 104 interpolates between color conversions 302-306 in color conversion table 110 to generate new color conversions (see step 214). For instance, if a color is encountered that lies between color conversions 303-304 (see FIG. 3), then processor 104 may perform a multi-dimensional interpolation using color conversions 303-304 to generate a new color conversion for the missing color conversion.

Processor 104 stores the new color conversions in second locations in hash table 108 (see step 216). For example, processor 104 may generate a hash value based on the input color space value for the new color conversion, identify a hash index in hash table 108 that corresponds to the hash value, and store the new color conversion at a location associated with the hash index. FIG. 6 illustrates new color conversions 602-603 that have been added to hash table 108 in an exemplary embodiment. In this embodiment, new color conversions 602-603 correspond to second locations 403 and 406, respectively, although these relationships are merely for purposes of discussion.

Processor 104 marks second locations 403 and 406 for new color conversions 602-603 in hash table 108 as non-persistent (see step 218). One example of how second locations 403 and 406 may be marked as non-persistent is using bit fields. For instance, a particular bit location for a bit field may be set to one, which allows processor 104 to identify which locations 402-406 in hash table 108 are non-persistent. Using bit fields is just one example, and others may exist. Multiple bit fields may be used to identify persistent/non-persistent locations, or one bit field may be used. If one bit field is used, then processor 104 may use complimentary bit values to represent persistent/non-persistent locations. If multiple bit fields are used, then processor 104 may use different bit positions in the bit fields to represent whether the locations are persistent or non-persistent.

In some cases, it may be desirable to re-initialize hash table 108. For example, if hash table 108 is full or nearly full, it may be desirable to re-initialize hash table 108 to make locations 402-406 in hash table 108 available to store new color conversions. In addition or alternatively, it may be desirable to re-initialize hash table 108 when the process of storing new color conversions into hash table 108 generates a large number of hash collisions. Since multiple colors in the input color space may generate the same hash value, it is possible that a location in hash table corresponding to the hash value may store a different color conversion than what is needed for the input color. The result is that a number of different locations may be investigated based on a pre-determine pattern that may depend on an offset applied to the hash value itself.

In response to processor 104 determining that hash table 108 is to be re-initialized, processor 104 re-initializes hash table 108 by allowing the reuse of second locations 403 and 406 in hash table 108 that are marked as non-persistent (see step 220). To allow reuse of second locations 403 and 406, processor 104 may allow the storage of subsequent color conversions generated during processing of the print job at location 403 and/or location 406.

Processor 104 also prevents reuse of first locations 404-405 in hash table 108 that are marked as persistent (see step 222). To prevent reuse of first locations 404-405, processor 104 bypasses or prevents the storage of color conversions that are generated during processing of the print job at location 404 and/or location 405. This ensures that the user-defined color conversion 502 is not overwritten in hash table 108.

Although the particular implementation of how locations 402-406 in hash table 108 are made available for reuse, one embodiment may comprise identifying locations 402-406 in hash table 108 that are marked as non-persistent (e.g., second locations 403 and 406), and removing the mark. Removing the mark may entail clearing a bit associated with second locations 403 and 406. FIG. 7 illustrates new color conversions 602-603 that have been marked as free in hash table 108 in an exemplary embodiment.

EXAMPLE

The following example is provided merely for purposes of discussion. The example is just one possible implementation for allowing reuse of hash tables, and others exist. Further, the following example is not intended to limit the scope of the claims.

FIG. 8 illustrates a hash table 800 with marked free locations in an exemplary embodiment. Hash table 800 in this embodiment includes a number of locations 801-805, which provide storage for color conversion values. Also illustrated in FIG. 8 is array 810. Array 810 includes fields 811-815 that are used to indicate whether locations 801-805 are free, used, or persistent. In this embodiment, free locations are marked in array 810 with an 8-bit binary number 00000000.

Figure 9:
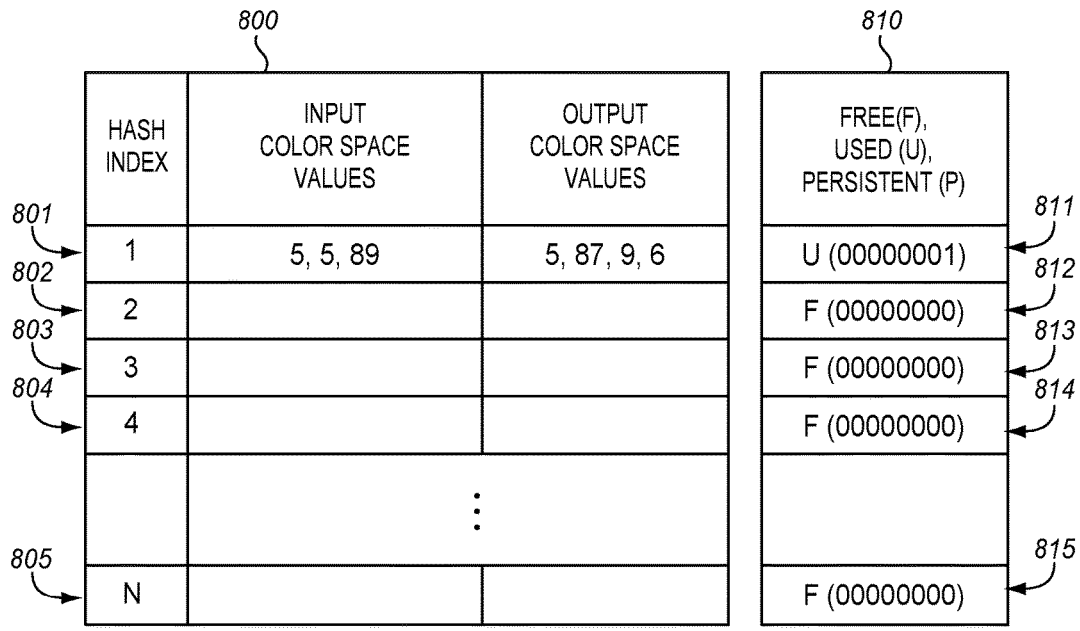
FIG. 9 illustrates the hash table with some locations marked as used in an exemplary embodiment.

During initialization of hash table 800, color conversions are entered into hash table. Locations storing these entries are marked as used. FIG. 9 illustrates hash table 800 with some locations marked as used in an exemplary embodiment. In this embodiment, location 801 is marked as used by setting the Least Significant Bit (LSB) in field 811 corresponding to location 801. Used locations are marked in array 810 with an 8-bit binary number 00000001.

Figure 10:
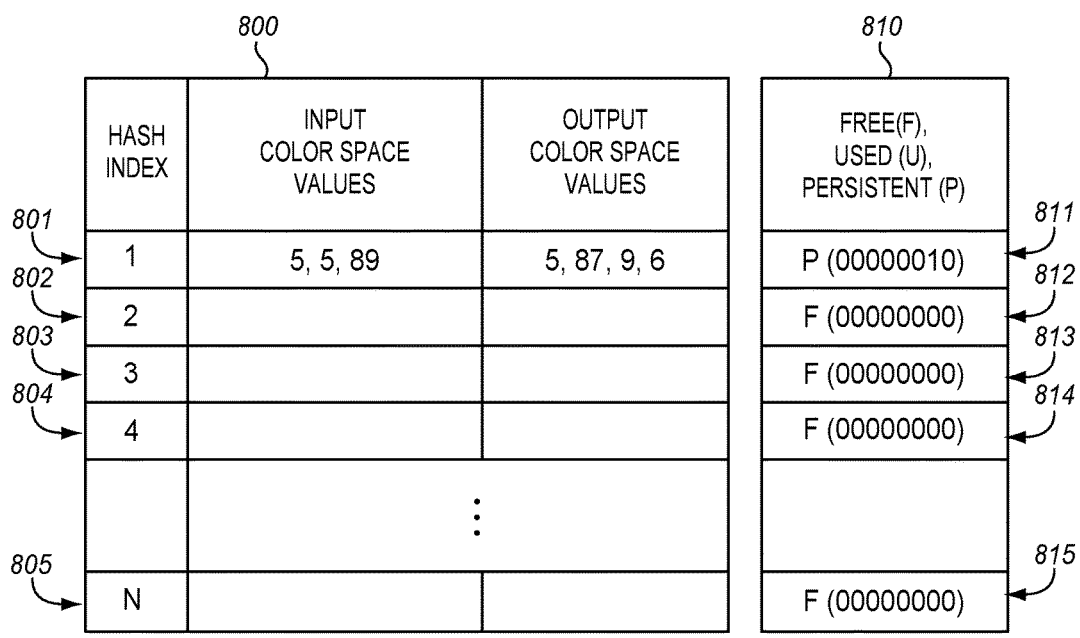
FIG. 10 illustrates the hash table with some locations marked as persistent in an exemplary embodiment.

At some point it may be desirable to save the state of hash table 800. For instance, if hash table 800 includes user-defined color conversions, then it may be desirable to mark the entries as persistent. FIG. 10 illustrates hash table 800 with some locations marked as persistent in an exemplary embodiment. In this embodiment, location 801 is marked persistent by left-shifting field 811 by one bit position. Persistent locations are marked in array 810 with an 8-bit binary number 00000010.

Figure 11:
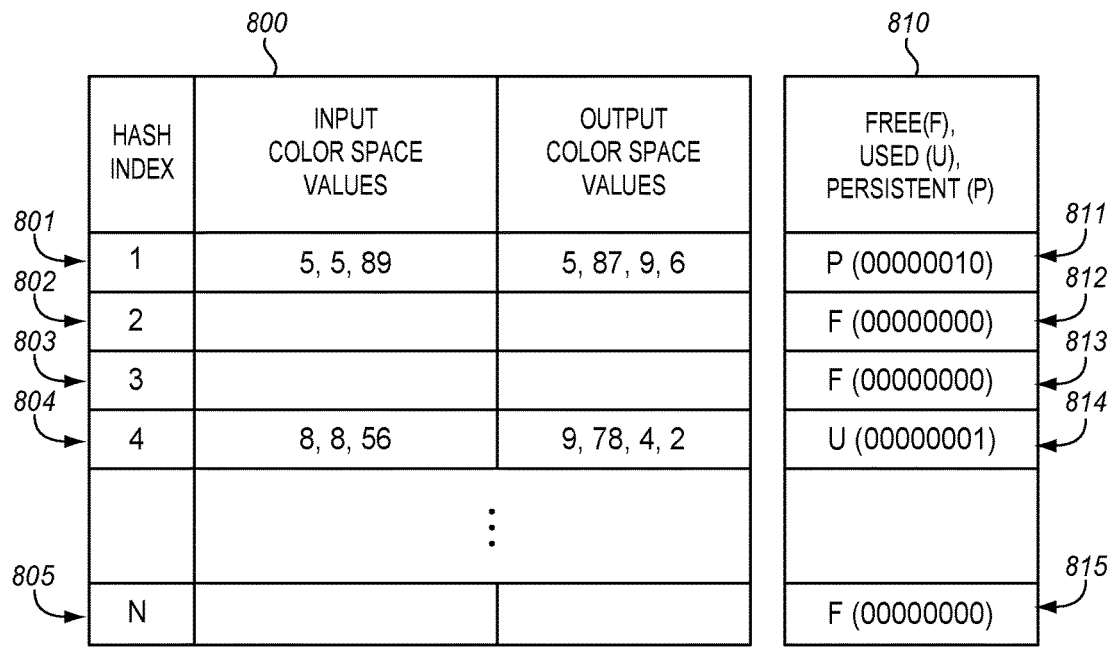
FIG. 11 illustrates the hash table with some locations marked as persistent and other locations marked as used in an exemplary embodiment.

Subsequent color conversions may be added to hash table 800, and their corresponding locations are marked as used. FIG. 11 illustrates hash table 800 with some locations marked as persistent and other locations marked as used in an exemplary embodiment. Location 804 is marked as used (binary 00000001).

Figure 12:
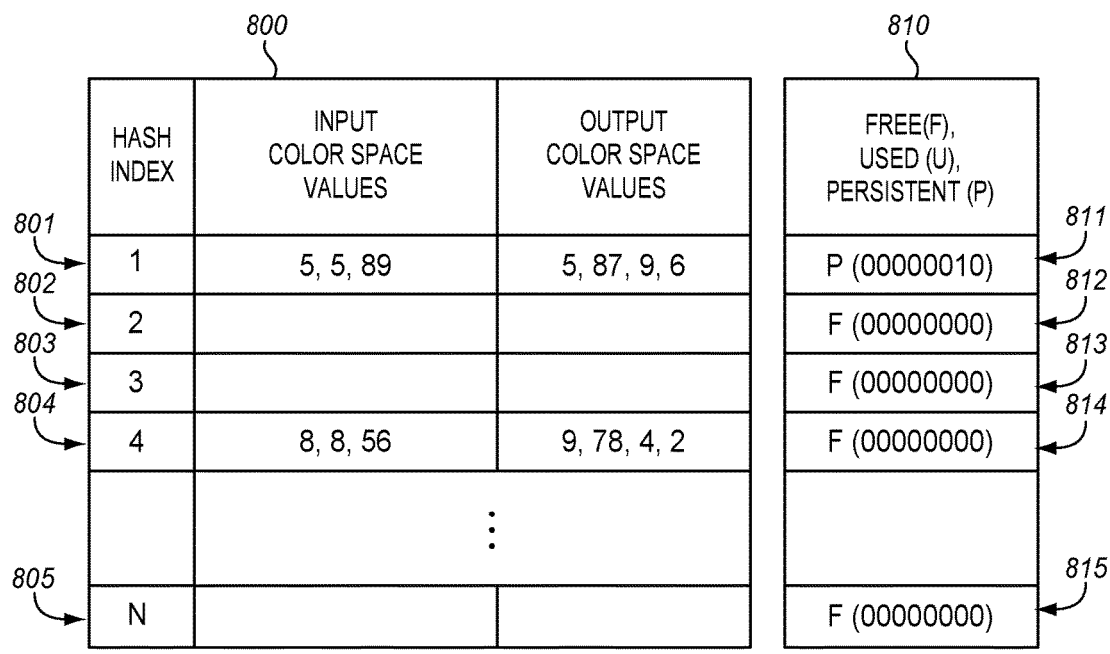
FIG. 12 illustrates the hash table with some locations marked as persistent, and previously used entries marked as free in an exemplary embodiment.

As discussed previously, it is often desirable to re-initialize a hash table while allowing the persistent entries to remain. This may be performed easily and quickly by clearing the LSB in fields 811-815. FIG. 12 illustrates hash table 800 with some locations marked as persistent, and previously used entries marked as free in an exemplary embodiment. In this case it is not necessary to clear location 804, since its corresponding field 814 is now marked free. Location 804 is now available for re-use, if desired. For example, hash table 800 may store a different color conversion at location 804, which may arise when different input colors share the same hash value.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 13:
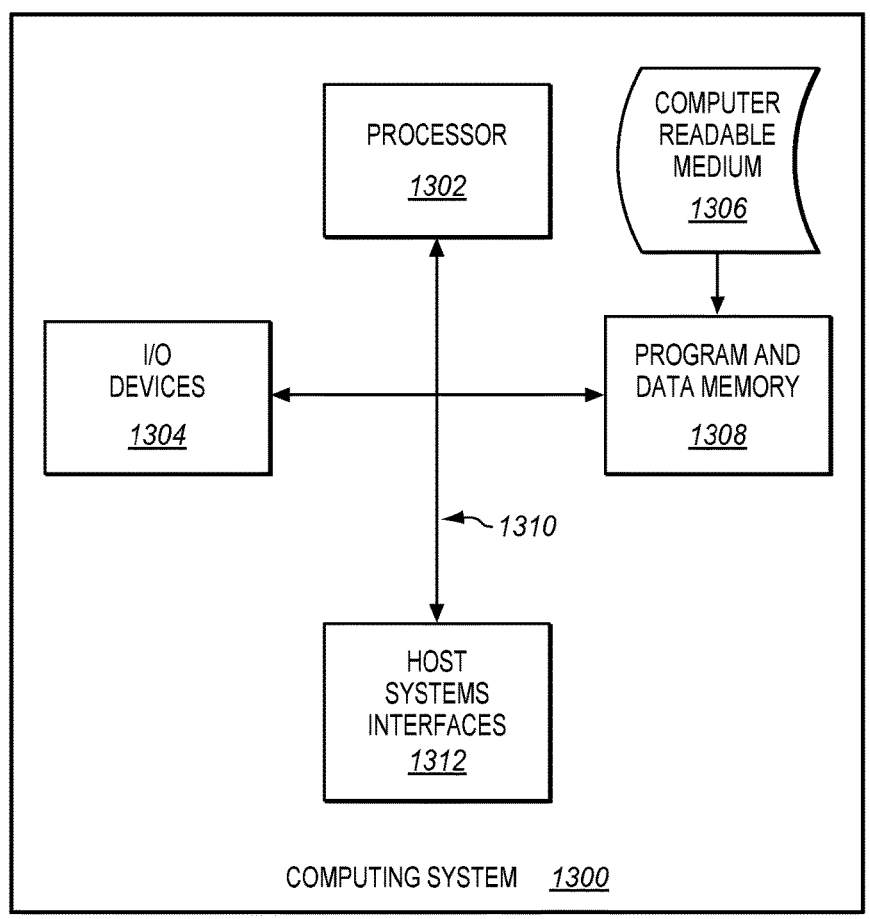
FIG. 13 illustrates a computing system in which a computer readable medium may provide instructions for performing any of the functionality disclosed herein for a controller of the printing system of FIG. 1.

In one embodiment, the invention is implemented in software, which includes but is not limited to firmware, resident software, microcode, etc. FIG. 13 illustrates a computing system 1300 in which a computer readable medium 1306 may provide instructions for performing any of the functionality disclosed herein for controller 102.

Furthermore, the invention can take the form of a computer program product accessible from computer readable medium 1306 that provides program code for use by or in connection with a processor or any instruction execution system. For the purposes of this description, computer readable medium 1306 can be any apparatus that can tangibly store the program for use by or in connection with the instruction execution system, apparatus, or device, including computing system 1300.

Computer readable medium 1306 can be any tangible electronic, magnetic, optical, electromagnetic, infrared, or semiconductor system (or apparatus or device). Examples of computer readable medium 1306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 1300, suitable for storing and/or executing program code, can include one or more processors 1302 coupled directly or indirectly to memory 1308 through a system bus 1310. Memory 1308 can include local memory employed during actual execution of the program code, bulk storage, and cache memories which provide temporary storage of at least some program code in order to reduce the number of times code is retrieved from bulk storage during execution. Input/output or I/O devices 1304 (including but not limited to keyboards, displays, pointing devices, etc.) can be coupled to the system either directly or through intervening I/O controllers. Network adapters may also be coupled to the system to enable computing system 1300 to become coupled to other data processing systems, such as through host systems interfaces 1312, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof.

The invention claimed is:

1. A system comprising:
a memory configured to store:
a pre-defined color conversion table having a subset of color conversions that map an input color space to an output color space; and
a hash table having a finite number of locations for an addition of color conversions that map the input color space to the output color space; and
a processor configured to receive a print job and user-defined color conversions for colors in the print job, to store the user-defined color conversions in first locations in the hash table, to mark the first locations as persistent, and to process the print job utilizing the pre-defined color conversion table to convert colors in the print job to the output color space;
responsive to encountering colors in the print job that do not have color conversions in the pre-defined color conversion table, the processor is configured to interpolate between color conversions in the pre-defined color conversion table to generate new color conversions, to store the new color conversions in second locations in the hash table, and to mark the second locations as non-persistent;
the processor configured to determine that the hash table is to be re-initialized, and to re-initialize the hash table to allow reuse of the second locations in the hash table during processing of the print job that are marked as non-persistent, and to prevent reuse of the first locations in the hash table during processing of the print job that are marked as persistent.

2. The system of claim 1 wherein:
the processor is configured to determine that the hash table is to be re-initialized in response to a determination that space available to store the new color conversions in the hash table is less than a threshold.

3. The system of claim 1 wherein:
the processor is configured to determine that the hash table is to be re-initialized in response to a determination that a number of hash collisions that occur when storing the new color conversions in the hash table is greater than a threshold.

4. The system of claim 1 wherein:
the processor is configured to identify the second locations in the hash table that are marked as non-persistent, and to remove the non-persistent mark to allow reuse of the second locations in the hash table during processing of the print job.

5. The system of claim 1 wherein:
the hash table comprises an open address hash table.

6. The system of claim 1 further comprising:
a plurality of print heads, each associated with one of a Cyan, Magenta, Yellow, Key black (CMYK) colorant;
wherein the processor is configured to utilize color conversions in the hash table and the print heads to mark the print job to a printable medium.

7. A method comprising:
storing a pre-defined color conversion table having a subset of color conversions that map an input color space to an output color space;
storing a hash table having a finite number of locations for an addition of color conversions that map the input color space to the output color space;
receiving a print job and user-defined color conversions for colors in the print job;
storing the user-defined color conversions in first locations in the hash table;
marking the first locations as persistent;
processing the print job utilizing the pre-defined color conversion table to convert colors in the print job to the output color space;
responsive to encountering colors in the print job that that do not have color conversions in the pre-defined color conversion table:
interpolating between color conversions in the pre-defined color conversion table to generate new color conversions;
storing the new color conversions in second locations in the hash table; and
marking the second locations as non-persistent; and
responsive to determining that the hash table is to be re-initialized, to re-initialize the hash table by:
allowing reuse of the second locations in the hash table during processing of the print job that are marked as non-persistent; and
preventing reuse of the first locations in the hash table during processing of the print job that are marked as persistent.

8. The method of claim 7 wherein determining that the hash table is to be re-initialized further comprises:
determining that space available to store the new color conversions in the hash table is less than a threshold.

9. The method of claim 7 wherein determining that the hash table is to be re-initialized further comprises:
determining that a number of hash collisions that occur when storing the new color conversions in the hash table is greater than a threshold.

10. The method of claim 7 wherein allowing reuse of the second locations further comprises:
identifying the second locations in the hash table that are marked as non-persistent; and
removing the non-persistent mark to allow reuse of the second locations in the hash table during processing of the print job.

11. The method of claim 7 wherein:
the hash table comprises an open address hash table.

12. The method of claim 7 further comprising:
utilizing a plurality of print heads, each associated with one of a Cyan, Magenta, Yellow, Key black (CMYK) colorant, to mark the print job to a printable medium based on the color conversions in the hash table.

13. A non-transitory computer readable medium embodying programmed instructions which, when executed by a processor of a printing system, direct the processor to:
store a pre-defined color conversion table having a subset of color conversions that map an input color space to an output color space;
store a hash table having a finite number of locations for an addition of color conversions that map the input color space to the output color space;
receive a print job and user-defined color conversions for colors in the print job;
store the user-defined color conversions in first locations in the hash table;
mark the first location as persistent;
process the print job utilizing the pre-defined color conversion table to convert colors in the print job to the output color space;
responsive to encountering colors in the print job that do not have color conversions in the pre-defined color conversion table, the programmed instructions further direct the processor to:
interpolate between color conversions in the pre-defined color conversion table to generate new color conversions;
store the new color conversions in second locations in the hash table; and
mark the second locations as non-persistent; and
responsive to determining that the hash table is to be re-initialized, the programmed instructions further direct the processor to re-initialize the hash table to:
allow reuse of the second locations in the hash table during processing of the print job that are marked as non-persistent; and
prevent reuse of the first locations in the hash table during processing of the print job that are marked as persistent.

14. The non-transitory computer readable medium of claim 13 wherein the programmed instructions further direct the processor to:
determine that the hash table is to be re-initialized in response to a determination that space available to store new color conversions in the hash table are less than a threshold.

15. The non-transitory computer readable medium of claim 13 wherein the programmed instructions further direct the processor to:
determine that the hash table is to be re-initialized in response to a determination that a number of hash collisions that occur when storing the new color conversions to the hash table is greater than a threshold.

16. The non-transitory computer readable medium of claim 13 wherein the programmed instructions further direct the processor to:
identify the second locations in the hash table that are marked as non-persistent, and to remove the non-persistent mark to allow reuse of the second locations in the hash table during processing of the print job.

17. The non-transitory computer readable medium of claim 13 wherein:
the hash table comprises an open address hash table.

18. The non-transitory computer readable medium of claim 13 wherein the programmed instructions further direct the processor to:
utilize a plurality of print heads, each associated with one of a Cyan, Magenta, Yellow, Key black (CMYK) colorant, to mark the print job to a printable medium based on the color conversions in the hash table.

* * * * *